Patented Dec. 3, 1940

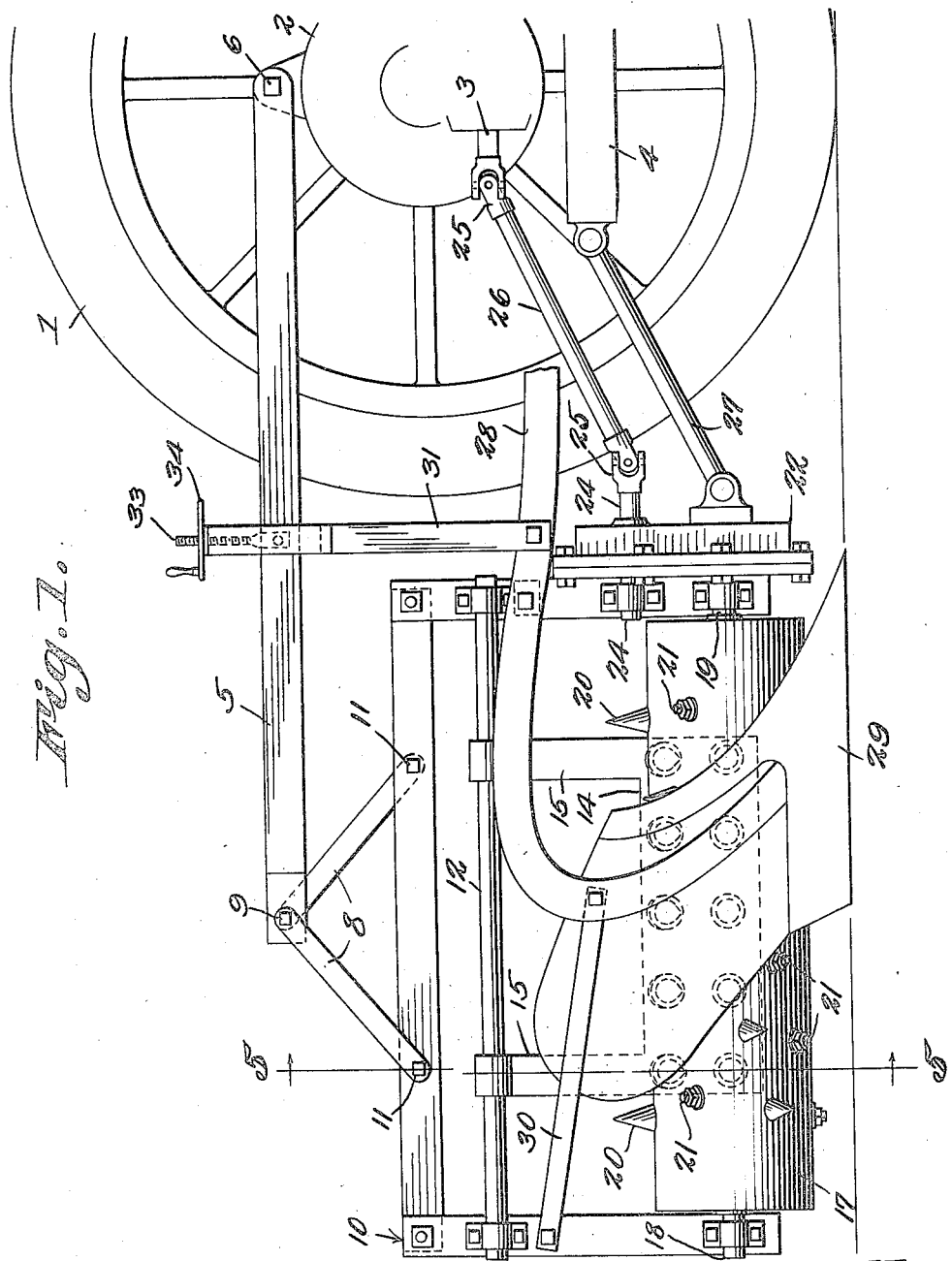

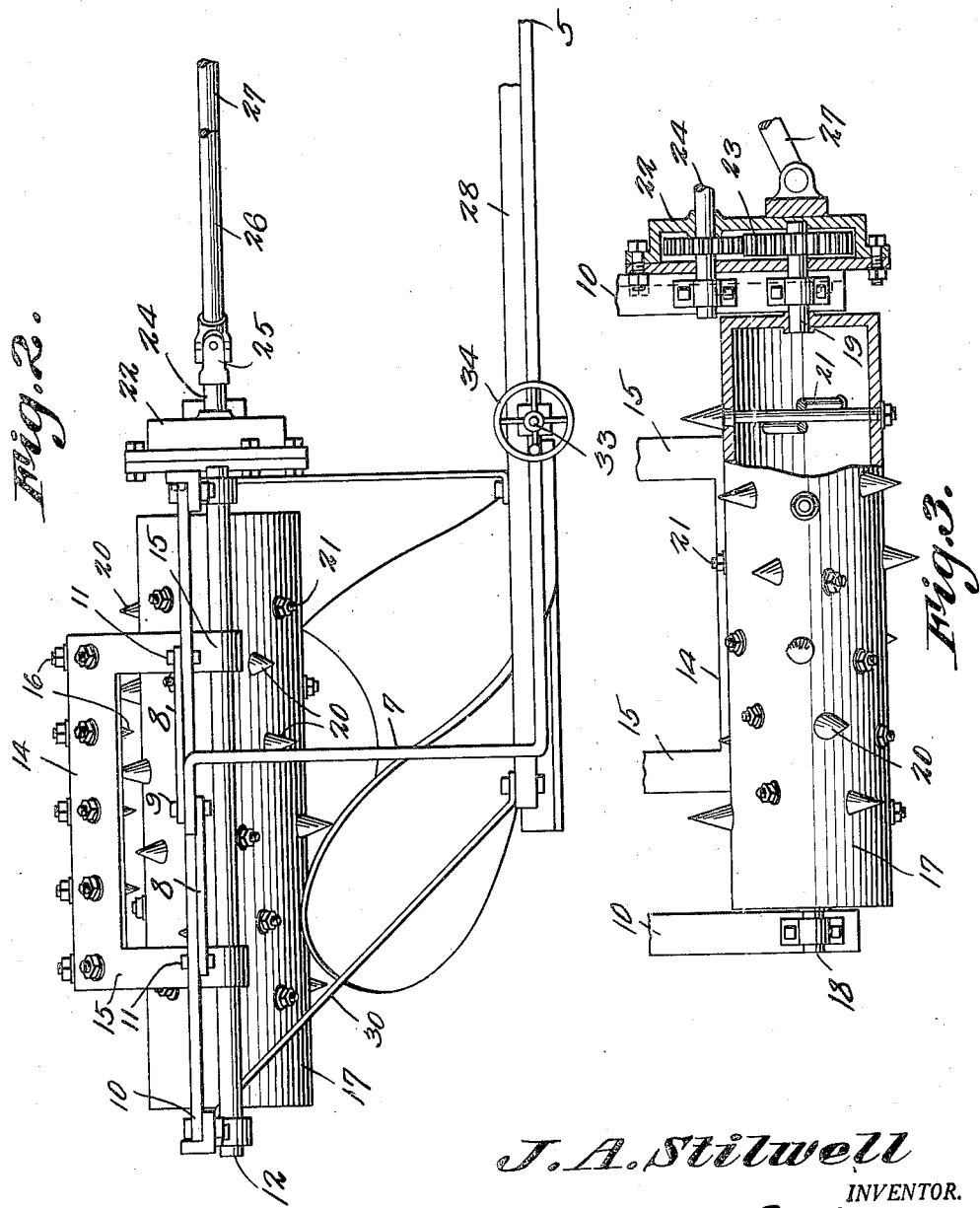

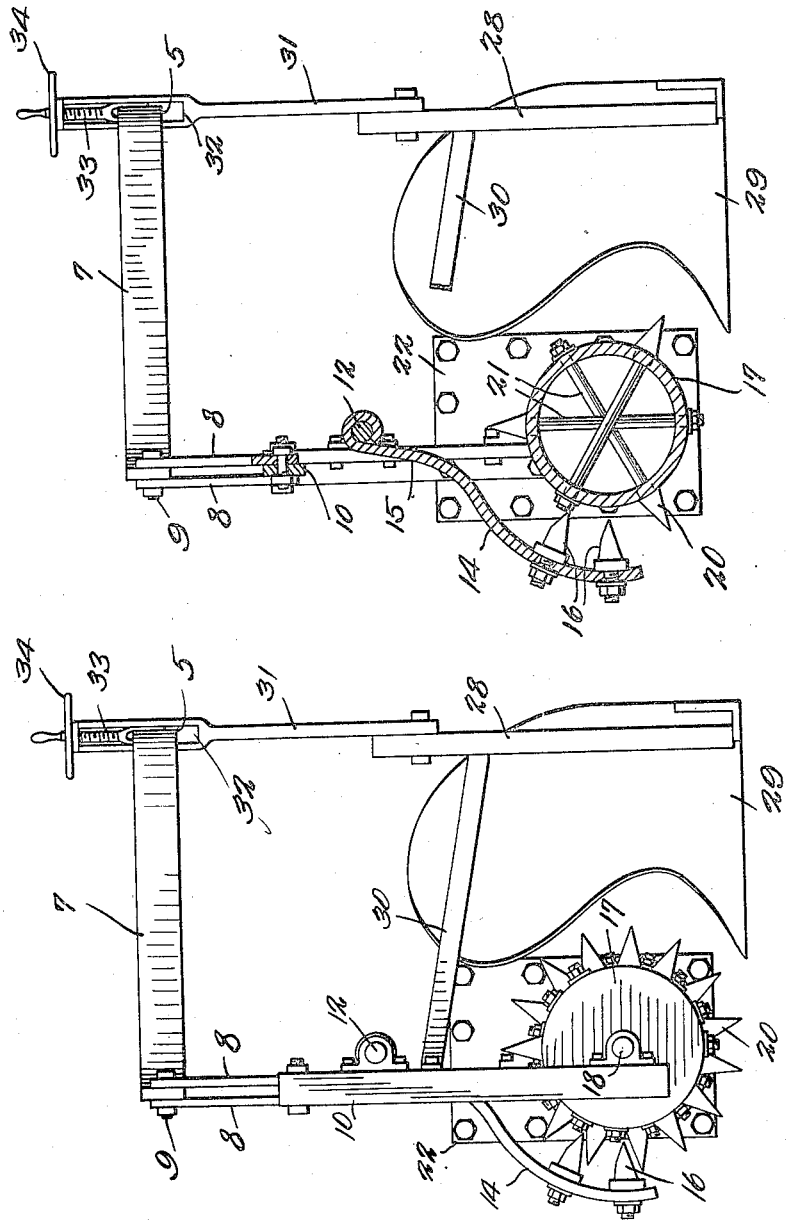

2,223,707

UNITED STATES PATENT OFFICE 2,223,707

SOIL PULVERIZER

John A. Stilwell, Charlotte, N. C.

Application November 22, 1939, Serial No. 305,722

3 Claims. (Cl. 97—38)

Generally stated, when the soil is prepared for seeding, it is necessary to plow, break up air-hardened clods with a harrow, and go over the soil with a smoothing harrow. The present invention aims to provide a simple structure whereby the three aforesaid operations may be combined in one, a rotary soil-engaging element, receiving earth from a plow share, serving to cast the earth against a swinging breast member, a finely divided earth resulting, and that earth being composed of top soil, and sub-soil not too remote to be reached by a plow share.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:

Fig. 1 shows in side elevation, a machine constructed in accordance with the invention;

Fig. 2 is a top plan wherein parts are broken away;

Fig. 3 is a side elevation wherein parts are broken away;

Fig. 4 is an end elevation;

Fig. 5 is a cross section on the line 5—5 of Fig. 1.

In Fig. 1, there is shown the ground wheel 1 of a tractor, the numeral 2 designating the housing for the tractor axle. The tractor includes a power driven shaft 3 extended lengthwise of the draft line. The draw bar of the tractor is marked by the reference numeral 4.

A rearwardly extended bar 5 is provided, and has its forward end pivoted at 6 to the axle housing 2. It appears in Fig. 2 that the radius bar 5, which has up and down swinging movement, is provided with an inwardly extended, rectangularly disposed arm 7, whereunto downwardly diverging links 8 (Fig. 1) are pivoted as shown at 9.

The numeral 10 designates an inverted, U-shaped carrier, including a top piece and depending legs. The lower ends of the links 8 are fastened as indicated at 11 to the top piece of the carrier 10. Below the top piece of the carrier 10, a hanger rod 12, extended lengthwise of the draft line, is mounted to rock on the depending legs of the carrier.

The numeral 14 designates a breast plate, which is transversely curved, as shown in Fig. 4, to conform to the cylinder 17 of a soil-engaging element or member to be described in detail hereafter. The breast plate 14 extends longitudinally of the draft line and is supplied with upwardly prolonged extensions 15 secured to the hanger rod 12. The breast plate 14 is supplied with teeth 16 which project inwardly toward the draft line.

As has been hereinbefore intimated, a rotatable soil-engaging member is disposed parallel to the draft line and includes the cylinder 17. The cylinder 17 has a rear shaft 18 and a front shaft 19, the rear shaft being journaled on the rear leg of the carrier 10, and the front shaft being journaled on the front leg of the carrier. The cylinder 17 is provided with outstanding teeth 20, arranged in spiral lines, and forming parts of bolts 21, extended entirely through the cylinder 17, and held in place by nuts.

A casing 22 is secured to the forward leg of the carrier 10, and in it, the front shaft 19 of the cylinder 17 is journaled. By means of spur gears 23 in the casing 22, a driving connection is afforded between the front shaft 19 of the cylinder 17 and a shaft 24 mounted to rotate in the casing 22 and on the forward leg of the carrier 10. The gears 23 constitute a reducing train. Through the instrumentality of universal joints 25 and an upwardly and forwardly inclined shaft 26, a driving connection is afforded between the power driven shaft 3 of the tractor and the forward shaft 19 of the cylinder 17. A towing link 27 is located below the shaft 26 and is pivoted to the tractor draw bar 14 and to the casing 22.

The numeral 28 marks a plow beam, connected in any suitable way (not shown) to the tractor. The plow beam 28 carries a share 29, and Fig. 5 shows that the toothed cylinder 17 operates between the plow share and the toothed breast plate 14. A rearwardly extended and inwardly inclined brace 30 is pivoted to the plow beam 28 and to the rear leg of the carrier 10.

For the raising and lowering of the plow beam 28 and the share 29, there is supplied a hanger 31, having its lower end pivoted to the plow beam. It appears in Figs. 4 and 5 that the hanger 31 is provided at its upper end with an opening 32, through which the radius bar 5 passes. The lower end of a screw 33 is pivoted to the radius bar 5, within the opening 32 of the hanger 31.

A hand wheel 34 is threaded on the screw 33 and bears on the upper end of the hanger 31.

The drive for the cylinder 17 includes the shaft 3, the shaft 26, the shaft 24, the spur gears 23 of the reducing train, and the shaft 19.

The rotating cylinder 17 catches the earth cast laterally by the plow share 29, and the earth is tumbled against the teeth 16 of the hingedly mounted breast plate 14. The soil is properly divided and mixed, in that the top layer of mellow soil is mingled with the under layer of hardened soil, the surface of the ground being the better adapted to receive seed. By the use of the machine hereinbefore described, plowing, pulverizing and mixing are carried on simultaneously. The tractor is caused to go over the ground but once, and unnecessary packing is avoided, to say nothing of a saving in tractor fuel.

Having thus described the invention, what is claimed is:

1. In a combined agricultural machine, a radius arm, means for connecting the radius arm to a tractor, a carrier suspended from the radius arm, a toothed soil-engaging member journaled on the carrier, a toothed breast member mounted on the carrier for swinging movement toward and away from one side of the soil-engaging member, a plow disposed on the opposite side of the soil-engaging member, means cooperating with the plow and the radius arm to raise and lower the plow, and mechanism for rotating the soil-engaging member from a tractor.

2. A combined agricultural machine, constructed as set forth in claim 1, and wherein said mechanism comprises a speed reducing train mounted on the carrier, and a forwardly extended, tractor driven shaft assembled with one member of the gear train.

3. A combined agricultural machine, constructed as set forth in claim 1, in combination with a casing mounted on the carrier, a speed reducing train within the casing, and operatively connected with the soil-engaging member, means for operating the reducing train, and a towing connection assembled with the casing.

JOHN A. STILWELL.